United States Patent Office 3,400,204
Patented Sept. 3, 1968

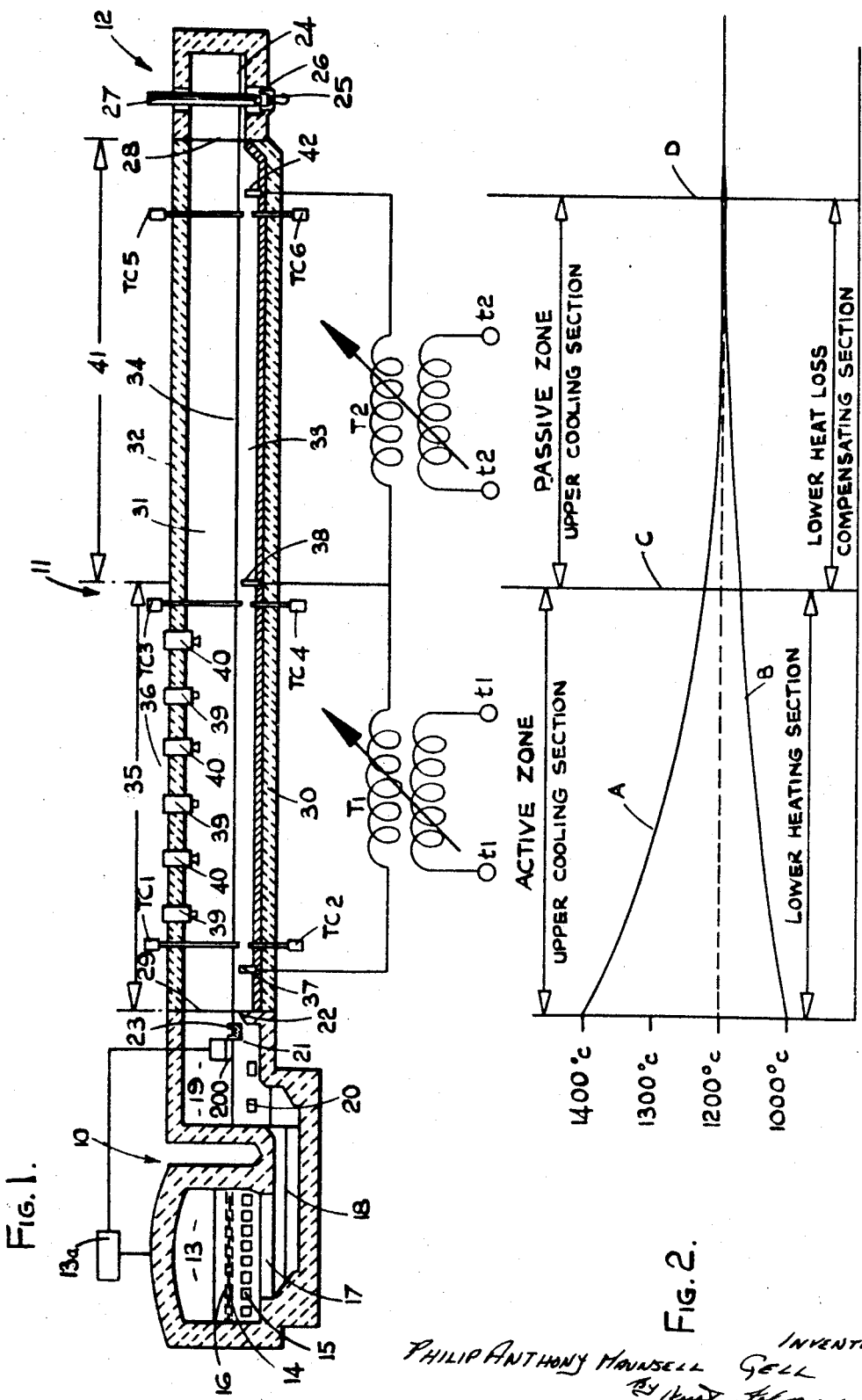

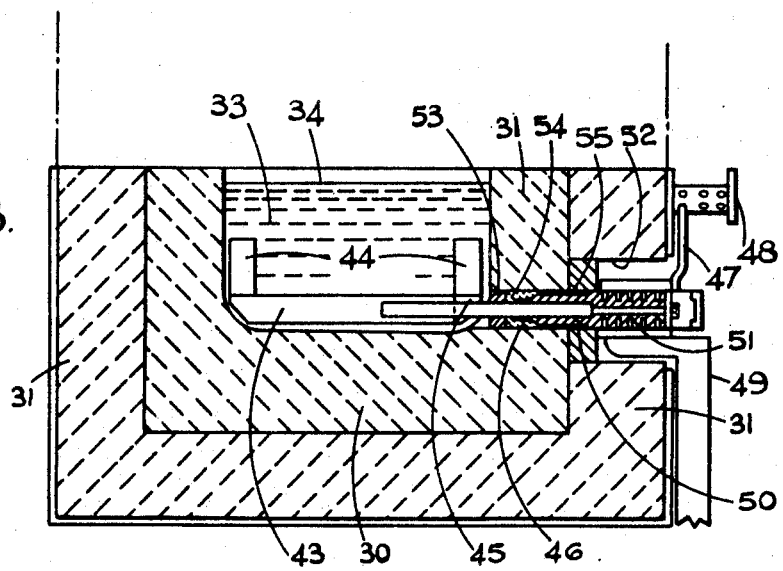
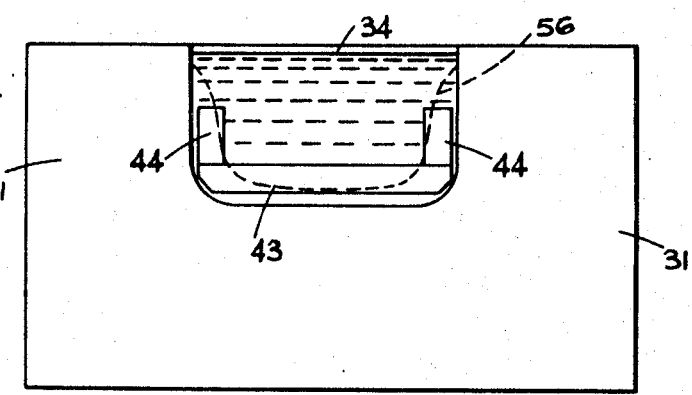
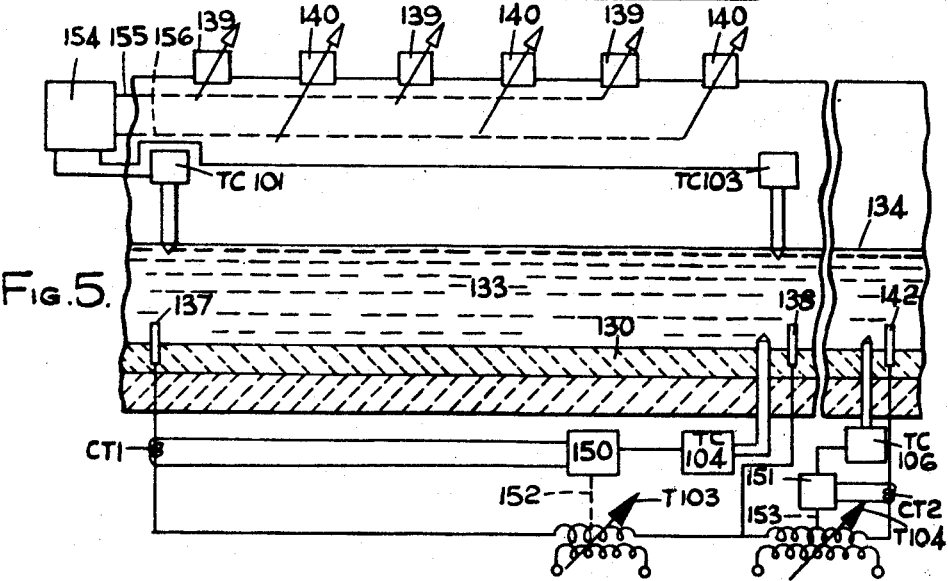

3,400,204
METHOD OF MELTING AND SUPPLYING GLASS ALONG A FEEDER DUCT
Philip Anthony Maunsell Gell, Kinver, near Stourbridge, England, assignor to Element Limited, Bilston, England, a British company
Filed June 9, 1964, Ser. No. 373,613
Claims priority, application Great Britain, Feb. 29, 1964, 8,595/64
10 Claims. (Cl. 13—6)

ABSTRACT OF THE DISCLOSURE

The temperature of a stream of glass flowing from a furnace through a long duct to a feeding chamber is made uniform over the cross-section of the stream by electric current flowing between U-shaped electrode assemblies spaced lengthwise of the duct near the bottom wall of the same and by cooling gas directed against the stream surface near the furnace. The current in two longitudinally consecutive sections of the duct is independently controlled by automatic devices in response to temperature and current sensing elements.

---

This invention relates to a method of controlling the temperature of molten glass (which term is to be deemed to include vitreous materials generally) while the glass is flowing in a generally horizontal direction along a duct from a furnace chamber containing a body of glass in a molten state to a feeder chamber from which it is required to be delivered for fabrication or other use. The invention also relates to a furnace assembly for carrying out the method.

In the specification of United States Letters Patent No. 3,030,434 granted to me, I have described and claimed a method of conducting molten glass along a feeder duct which is long relatively to its cross-sectional dimensions from a furnace chamber to a feeder chamber, such method comprising the steps of flowing the molten glass through said duct, passing an alternating current through said flowing molten glass lengthwise of the direction of flow thereof by communicating said current to said glass at a plurality of positions spaced apart longitudinally of said duct over an area extending for substantially the whole width and depth of the glass in the duct, and controlling the value of said current to effect heating of the glass uniformly between said positions. Said specification also describes and claims a furnace assembly for enabling the method to be carried out.

While this method as described and claimed in the specification of my prior patent does enable better control to be exercised than heretofore over the temperature of the glass as it flows along the feeder duct, I have been able to attain a still better degree of control by certain improvements in the method as hereinafter described. The improvements are based upon the realisation that one of the residual causes of temperature difference still occurring in the glass at the exit end of the feeder duct is a top to bottom temperature gradient existing in the glass when this flows into the entrance end of the feeder duct. A further cause is differential heat loss at positions around a perimeter of the transverse cross section of the glass in the feeder, such that greater heat loss tends to occur through the bottom wall and through the lower portions of the lateral walls of the feeder duct than is the case in respect of the upper portions of the lateral walls. Yet another cause is variation in the rate of throughput of the glass, that is to say the quantity of glass flowing in unit time from the exit end of the feeder duct.

Thus from one aspect the present invention resides in a method of controlling the temperature of molten glass while flowing along a duct from a furnace chamber to a feeder chamber comprising the steps of; causing said body to flow in an elongated stream having a free top surface, a bottom surface, and side surfaces connecting said top and bottom surfaces; directing a stream of a gas against the top surface of a longitudinal portion of said stream, the temperature of said gas being different from the temperature of said glass at said top surface, and passing electric current through this longitudinal portion in a path spaced from the top surface of the glass stream and adjacent the bottom surface. When the top surface temperature of the glass requires to be raised the gas would normally be constituted by the gaseous products of combustion from burners disposed above the glass.

The invention is also concerned with improvements in a furnace assembly comprising a furnace chamber for containing a body of molten glass, a feeder chamber from which such glass is delivered for use, and an elongated feeder duct extending substantially horizontally between and connected to said chambers and having longitudinal side walls and a bottom wall defining a channel for flow of molten glass from said furnace chamber to said feeder chamber.

The invention provides a plurality of electrode means spaced apart longitudinally of said feeder duct, each of said electrode means comprising a bottom electrode member adjacent the bottom wall and bordering the lowermost portion of the channel, the electrode means being arranged closely adjacent the walls of the duct to leave the flow channel substantially unobstructed, a supply circuit connected to said electrode means for passing electric current longitudinally of said channel between said bottom electrode members of said electrode means through a portion of said glass in said channel adjacent the bottom wall, and heat transfer means disposed in said duct at a level above said glass therein, for extracting heat therefrom along at least part of said duct.

Additional features of this invention will become apparent from the following detailed description of a preferred embodiment when considered with reference to the accompanying drawings wherein:

FIGURE 1 is a view in vertical cross section along the longitudinal centre line of a furnace assembly in accordance with the invention;

FIGURE 2 is a graphical representation of typical temperatures encountered in the upper and lower layers of glass along the length of the feeder duct;

FIGURE 3 is a partial transverse cross section through the feeder duct showing the electrodes which serve to supply heat to the lower layer and to the lower portions of lateral boundary layers of glass in the duct;

FIGURE 4 is a diagrammatic representation illustrating correlation between the electrode configuration and dimensions and the regions over which lateral and lower layers of glass tend to become cooled through heat loss through the walls of the feeder duct;

FIGURE 5 is a fragmentary view of the arrangement shown in FIGURE 1 modified to incorporate automatic control of operation of the heat exchange means and of the current flowing between the electrode means.

Referring firstly to FIGURE 1 the furnace assembly therein shown comprises a glass melting furnace proper 10 for supplying refined glass to a feeder duct 11 for receiving at its entrance end this supply of refined glass, and a feeder chamber 12 through which the glass delivered from the feeder duct is fed out for fabrication or other use.

I have shown by way of example as the glass melting and refining furnace proper a furnace of the form described and claimed in the specification of United States Letters Patent No. 2,899,476. Such furnace comprises a furnace chamber 13 of generally rectangular form in plan containing a body 14 of molten glass through which an alternating electric current is passed between sets of electrodes 15 disposed at opposite ends of the furnace chamber, whilst glass batch materials in powdered or divided form are charged onto the surface of the molten body 14 from a batch loader 13a to form a batch crust 16 covering the surface.

In the bottom wall of the furnace chamber 13 is formed an outlet opening 17 which communicates by way of a duct 18 with a further chamber 19 which operates as the refining chamber.

In the refining chamber 19 the glass is further heated by passage of alternating current between opposed sets of electrodes 20, and the molten body of glass 21 contained in the refining chamber is delivered between the upper face of a lip or weir 22 and a transverse barrier 23 at the delivery end of the refining chamber.

It will be understood that whilst the melting and refining furnace 10 may be of the form illustrated, this particular form of melting and refining chamber is in fact less prone to produce a top and bottom temperature gradient in the glass emerging from the delivery end of the refining chamber than is the case with melting and refining furnaces wherein heat is supplied to the molten body of the glass exclusively by fuel fed burners disposed in the spaces above the glass in the melting chamber and in the refining chamber where such is separately provided. This will be evident from the fact that where such fuel fed burners are provided heat is conveyed to the glass partly by radiation from the walls of the chamber above the surface of the glass and partly by conduction from the heated air or gas in the space within the chamber above the surface of the glass and partly in some cases by direct contact between the flame of the burner and the surface of the glass itself.

In these cases there is thus inherently a much greater tendency to set up a temperature gradient from top to bottom of the glass with the highest temperature in the upper or surface layer and the lowest temperature in the bottom or lower layer than is the case with the melting and refining furnace illustrated, although such effect is present to some degree even in the latter case.

Whatever form of melting and refining furnace employed may be it is desired that in the feeding chamber 12 the temperature of the glass shall be as uniform as possible at all positions throughout the body of glass 24 contained therein. It is well known that temperature uniformity is important for a number of reasons. While by way of example I have illustrated a feeding chamber wherein discrete gobs of glass such as 25 are caused or permitted to be delivered from an orifice 26 in the bottom wall by means of a reciprocating plunger 27, it will be understood that in other forms of feeder furnace glass could be delivered as a continuous stream or sheet and that in such cases it is equally important to preserve temperature uniformity to minimise internal stresses in the formed article or product, and in some cases to minimise non-uniformity of other properties such as optical properties.

For this purpose the melting and refining furnace is connected to the feeder furnace by the relatively long feeder duct 11 which may have a length of as much as 20 feet which however may vary to suit particular requirements.

The internal width of the duct may be in the range 12 to 20 inches, a typical value being 16 inches. Its height measured internally from the bottom to the upper ends of the side walls as seen in FIGURE 3 may be in the range of 6 to 12 inches, a typical value being 9 inches.

This relatively long feeder duct defining a channel of which the cross sectional dimensions are small relative to the length affords the opportunity for correcting variations in the temperature throughout the transverse cross section of glass as this flows from one end of the duct to the other. However, the temperature of the glass which would exist at the exit end 28 would vary considerably as a function of the throughput, which typically may vary from a flow corresponding to 10 tons per day to 50 tons per day, it being borne in mind that the decrease in temperature from the entrance end 29 and the exit end 28 has heretofore been wholly brought about by natural cooling consisting of heat loss through the walls of the feeder duct itself.

Moreover, as will be evident from the foregoing description the temperature of the glass at the entrance end 29 is prone to be considerably higher in the upper or surface layer, for example typically 1400° C. in comparison with that which exists in the bottom or lower layer, typically 1100° C., so that each of these two layers and the intervening body of glass which exhibits a corresponding temperature gradient from top to bottom must be brought to a predetermined temperature, for example 1200° C. before the glass reaches the exit end 28 and notwithstanding that the whole furnace assembly may be required to be used at different rates of throughput at different times.

Accordingly the feeder duct which comprises a bottom wall 30, side walls such as 31, and a top wall 32 entirely enclosing the body 33 of molten glass flowing therethrough, the surface 34 of which however is spaced below the top wall 32, is equipped along a first or active zone 35 with a heat transfer means indicated generally at 36 for selectively extracting heat from or supplying heat to the upper layer of glass. In the active zone 35 the lower layer of glass and the lower portions of the lateral boundary layers are supplied with heat by passing alternating electric current longitudinally through the glass between longitudinally spaced electrodes 37 and 38. Although two only of these are shown at opposite ends of the active zone it will be understood that if desired there may be any number of such longitudinally spaced electrodes provided throughout the active zone.

The heat transfer means 36 may comprise cooling devices 39 such as nozzles for introduction of cooling air or gas in a direction such that it impinges on the surface 34 of the glass and fuel fed burners 40 which may be alternatively brought into operation in order to supply heat to the surface layer of the glass.

The cooling device would normally be brought into operation when the rate of throughput is high, for example at around 50 tons per day. For the lower rates of throughput the burners 40 would be operated.

In the lower layer of glass and throughout the lower portions of lateral boundary layers the temperature of the glass entering the feeder duct at its entrance end will normally be below the predetermined value of temperature required at the exit end, and consequently heat is supplied to these layers internally of the glass by the passage of alternating electric current as aforesaid.

FIGURE 2 illustrates typical temperature curves of which A shows a variation in temperature of the upper layer of glass throughout the length of the active zone, and B shows like variation in the temperature of the glass in the lower layer and in the lower portions of the lateral boundary layers.

It will be evident that at the position C, constituting the termination of the active zone, the upper layer and the lower layer and lower portions of the lateral boundary layers have temperatures approximating to the predetermined temperature required.

Preferably the active zone 35 occupies about half the total length of the feeder duct. The remaining length constitutes a second or passive zone 41 in which both the upper layer and the lower layer, together with the lateral boundary layers, are caused to approximate still further towards, and preferably attain, the predetermined temperature at the termination of the passive zone coincident with the exit end 28 of the feeder duct.

For this purpose some heat continues to be supplied to the lower layer and to the lower portions of the lateral boundary layers by passing alternating electric current longitudinally through the glass between electrode 38 and electrode 42.

A certain proportion of this heat is transmitted to the upper layer by conduction through the body of molten glass contained in the passive zone so as partly to compensate for natural cooling in the course of flow of the glass through this zone.

It will be evident, however, that the rate of transmission of heat to and from the glass in the passive zone is at an appreciably lower value than that obtaining in the active zone. Because of the lower rate of heat transference the temperature over a transverse cross section of the glass exhibits a much smaller gradient which may be virtually zero at the exit end of the feeder duct. There is also little or no tendency for the glass to flow in directions transversely of the desired longitudinal flow path due to convection effects.

To enable the requisite heat to be supplied to the lower layer of glass by means of the electrodes in both the active zone and the passive zone by electric currents of different strength, and to enable heating or cooling of the glass to be effected as required with respect to its upper layer in the active zone, temperature sensing means are provided for sensing the temperatures in the lower and upper layers of glass at various positions along the length of the feeder duct. Thus, for example thermo-couples TC1, TC3 and TC5 are immersed in the upper layer of glass at the ends of the feeder duct and at a position approximately midway along its length corresponding to the junction between the active and passive zones. Similarly thermo-couples TC2, TC4 and TC6 enable the temperature of the lower layer of glass to be sensed at corresponding positions.

According to the indication furnished on each of the lower thermo-couples TC2, TC4, TC6 the voltage between electrodes 37 and 38 on the one hand and electrodes 38 and 42 on the other hand, may be adjusted for example by provision of adjustable voltage transformers T1 and T2 connected as shown in FIGURE 1. The transformer T1 and the electrodes 37 and 38 constitute one branch circuit and the transformer T2 and the electrodes 38 and 42 constitute another branch circuit.

The primary windings of these transformers have terminals $t1$ and $t2$ respectively which may be connected to respective phases of a poly-phase supply or, if desired, in series or in parallel to a single phase supply.

In FIGURE 5 which shows a modified arrangement, parts corresponding to those already described in relation to FIGURE 1 are designated by like characters of reference with the prefix 100 so as to lie in the series 100 to 200.

Referring firstly to the supply circuit for the electrode means respective branches thereof incorporating variable voltage transformers T103 and T104 feed the electrodes 137 and 138 on the one hand and the electrodes 138 and 142 on the other hand.

The current passing between each of these pairs of electrodes is stablished by the provision of a current stabilising means comprising, for example, current transformers CT1 and CT2 providing an input to computers or current controlling devices 150 and 151 for the two portions of the supply circuit.

An operative coupling which may be mechanical, electromagnetic, or of other suitable form as indicated at 152 and 153 serves to connect the computers or current controlling devices with the respective tarnsformers T103 and T104.

The computers or current controlling devices 150 and 151 also receive an input from respective thermo-couples TC104 and TC106 which are disposed at a position such as to sense the temperature of the glass flowing out of each of the controlled zones. The electrodes 137 and 138 with their associated transformer T103 constitute one branch circuit whereas the electrodes 138 and 142 and their associated transformer T104 constitute a further branch circuit.

The input from the current transformers CT1 and ST2 tends to set the voltage of the associated tarnsformer T103 and T104 as the case may be to a value such as to maintain constant current through the lower layer of glass.

Consequently this feature of the supply circuit inherently compensates to some extent for variations in the temperature of glass flowing into the feeder duct and which arise from variations in the temperature of the glass flowing into it. If the glass entering the feeder duct is above the average temperature encountered over the period of operation its electrical resistance is lower, but since the current flowing through it is stablished to at least approximately constant or datum value the electrical power dissipated in the glass will be reduced with consequent temperature which would otherwise occur at the exit end of the feeder duct.

The supply circuit however also provides for pre-setting of the constant or datum value of current by means of a signal or input supplied to each of the computers or controllers 150 or 151 from their respective thermo-couples TC104, TC106 so as still further to minimise any departure from the desired temperature of glass flowing out from the exit end of the feeder duct.

It will be apparent that by applying such control in both the active and passive zones very precise control over the temperature of the glass leaving the feeder duct of the exit end is possible. Variations in the temperature of the glass flowing into the passive zone are substantially reduced by virtue of the operation of the computer or current controller 150 in the supply circuit for the active zone, so that the current controller or computer 151 is subjected to error signals by way of its thermo-couple 106 and current transformer CT2 of a very much lower order.

The heat transformer means comprising the cooling devices 139 and fuel fed burners 140 may also advantageously be controlled automatically by means of a setting device 154 which is connected mechanically, electromagnetically, or by other suitable means as indicated at 155 and 146 to the group of cooling devices 139 and burners 140.

The setting device is itself controlled by signals received from thermo-couples TC101 and TC103 and may be arranged to bring the cooling devices or burners selectively into operation and to adjust these to provide the required degree of heating or cooling to achieve a predetermined temperature at the thermo-couple TC103.

Referring now specifically to the construction of electrodes employed as illustrated in FIGURE 3 each such electrode is U-shaped and comprises a bottom electrode member 43 in the form of an elongated plate or strip of molybdenum or other suitable metal which does not react with or discolour the glass and is not destructively eroded thereby. At its ends are upstanding lateral electrode members 44 fixed to the bottom electrode member in any suitable manner, for example by being bolted thereto or welded thereto, and also in the form of elongated plates or strips. Each of the electrode members 43 and 44 are disposed in a vertical plane at right angles to the centre line of the feeder duct.

In order to enable each electrode to be connected to the supply circuit and also to provide support for the electrode the bottom electrode member 43 has fixed to it at laterally projecting lead-in portion 45 which extends through an opening 46 in the adjacent lateral wall 31 of the feeder duct at the lower end thereof.

The electrode is partly supported by contact between the lower edge of the member 43 with the bottom wall of the duct and partly by the cantilever support furnished by the lead-in portion 45.

The lead-in portion 45 forms part of a structure disposed within the opening 46 of a side wall 31. The lead-in portion 45 which is in the form of a stem of circular cross section is tightly embraced by a sleeve 50 of copper, the inner end portion of which projects into but not through the opening 46 and engages with the walls thereof to support the lead-in portion 45 at its rearward end.

The lead-in portion or stem 45 is formed of molybdenum which although capable of withstanding immersion in the molten glass oxidises rapidly in air at temperatures in excess of 500° C. The copper sleeve 50 is cooled at its outer end by means of air delivered through a duct 49 and directed on to fins 51 formed at the outer end of the sleeve externally thereof and disposed in an enlargement 52 at the outer end of the opening 46.

Within the opening 46 the inner part of the lead-in portion or stem 45 is protected by means of a sealing collar 53 which also serves to locate and support the stem at its forward end within the opening. Further protection is given by a filling of a porous protective substance such as particles of nickel aluminide disposed in the space 54 while this part of the stem may be further protected by a coating of a heat-resistant enamel having a high borosilicate content. Inert gas such as nitrogen or hydrogen may also be fed in through a transverse passageway 55 to flow axially inwardly through a space between the opening 46 and the sleeve 50 so as to provide an inert or non-oxidising atmosphere within the space 54.

Electrical connection to the outer end of the stem is by means of a cable 47, cables for all of the electrodes being contained in a duct 48.

FIGURE 4 represents diagrammatically the relationship between the configuration of each of the electrodes 37, 38, 42 as viewed in a direction longitudinally of the feeder duct and the regions of the peripheral margin of the transverse cross section of the glass from which heat loss is most pronounced. For the sake of simplicity only the electrode members 43, 44 are shown, the lead-in portion or stem 45 and associated structure being omitted.

The dashed line 56 represents the inner boundary of layers of glass which tend to become cooled by heat loss through the walls of the feeder duct to an extent which is rather greater than that which occurs in respect of the upper portions of the lateral boundary layers (that is above the line 56 at each of its ends).

The height of each of the electrode members 44 is thus selected so that these at least approximately coincide with the lower portions of the lateral boundary layers from which heat loss is greatest. The width of the electrode members 44 is also selected with this criterion in view as is also the height of the lower electrode member 43 so that as a whole there is approximate coincidence between the part of the cross sectional area bounded by the line 56 and by the bottom and lateral walls of the feeder duct and the area presented longitudinally of the duct by the electrode as a whole. Typically the electrode members 44 have a height such that their upper ends lie approximately midway between the bottom of the duct and the surface of the glass. It will be evident that the height of the lower electrode member 43 (measured normal to the bottom wall of the duct) is only a relatively small proportion of the depth of the glass in the feeder duct, for example of the order of 20%, and similarly the width of each of the electrode members (measured normal to the adjacent side wall) is of the order of 12% of the overall width of the feeder duct.

Consequently the presence of each of the electrodes creates very little impediment or obstruction to longitudinal flow of glass along the duct.

The level of the glass in the duct maintained constant by level sensing means 200 in the chamber 19, such means 200 being connected to the batch loader 13a, which is controlled automatically or manually in dependence on the signal received from the sensing means 200.

In some cases where there is little or no heat loss from the side or bottom walls the electrode member 44 alone may be provided in the latter case these being carried at the lower ends of dependent support elements.

What I claim then is:

1. In a furnace assembly including a furnace chamber for containing a body of molten glass and a feeder chamber communicating with said furnace chamber for delivering such glass for use, the improvement which comprises:
(a) a horizontally elongated feeder duct connecting said chambers and defining a channel for flow of molten glass from said furnace chamber to said feeder chamber,
  (1) said duct having a bottom wall and two longitudinal side walls;
(b) a plurality of electrode means spaced longitudinally from each other in a peripheral zone of said duct adjacent said walls so as to leave said channel substantially unobstructed,
  (2) each of said electrode means including a bottom electrode member adjacent said bottom wall and bordering the lowermost portion of said channel;
(c) supply circuit means connected to said electrode means for passing electric current through said bottom electrode members of said electrode means and longitudinally through a portion of said glass in said channel adjacent said bottom wall; and
(d) heat transfer means in said duct for extracting heat from a portion of said glass in said duct upwardly spaced from said bottom wall.

2. In an assembly as set forth in claim 1, said duct having two longitudinal portions respectively defining a first zone of said channel adjacent said furnace chamber and a second zone of said channel adjacent said feeder chamber, respective pairs of said electrode means being arranged in said duct at the longitudinal ends of said zones, said supply circuit means including two branch circuuit means respectively connected to said pairs of electrode means for passing currents of different strength through said glass in said zones respectively, said heat transfer means being effective for extracting heat from said portion of said glass in said first zone.

3. In an assembly as set forth in claim 1, means for maintaining said glass in said channel at a predetermined level, each electrode means including a substantially U-shaped assembly of electrode members including said bottom electrode member and two lateral electrode members respectively adjacent said side walls, said electrode assembly being downwardly spaced from said level and extending in a plane transverse of the direction of elongation of said duct; said side walls, said level, and said heat exchanging means defining therebetween a space above said level and said heat exchanging means including cooling means for delivering a cooling fluid to said space, heating means for heating said space, and control means for selectively operating said cooling means and said cooling means.

4. In an assembly as set forth in claim 1, one of said side walls being formed with a plurality of apertures respectively adjacent said electrode assemblies, each electrode assembly further including lead-in means extending through the associated aperture, and supporting means in the aperture supporting said lead-in means, said electrode assembly being cantilevered on said lead-in means and engaging a portion of one of said walls spaced from said aperture.

5. In an assembly as set forth in claim 1, said supply circuit means including current controlling means for controlling the strength of the current passing through said electrode means, temperature sensing means responsive to the temperature of said portion of said glass adjacent said bottom wall and operatively connected to said current controlling means for changing said strength in response to the sensed temperature in a sense tending to maintain constancy of temperature, and current stabilizing means responsive to said strength and operatively connected to said current controlling means for changing said strength also in a sense tending to maintain constancy of temperature.

6. In an assembly as set forth in claim 1, heating means for heating said portion of said glass upwardly spaced from said bottom wall in said duct, and control means for selectively operating said heat transfer means and said heating means.

7. A method of controlling the temperature of a body of molten glass which comprises:
  (a) causing said body to flow in an elongated stream having a free top surface and a bottom surface;
  (b) directing a stream of gas against said top surface in a longitudinal portion of said stream,
    (1) the temperature of said gas being different from the temperature of said body of glass at said top surface; and
  (c) passing electric current through said longitudinal portion in a path spaced from said top surface and adjacent said bottom surface.

8. A method as set forth in claim 7, wherein said stream has side surfaces connecting said top and bottom surface, and said path is substantially U-shaped in cross section and having respective parts adjacent said bottom surface and said side surfaces.

9. A method as set forth in claim 8, which further comprises passing another electric current through another longitudinal portion of said stream in another path spaced from said top surface and adjacent said bottom surface, said electric currents being passed through said longitudinal portions simultaneously and being of different strength.

10. In a furnace assembly including a furnace chamber for containing a body of molten glass and a feeder chamber communicating with said furnace chamber for delivering such glass for use, the improvement which comprises:
  (a) a horizontally elongated feeder duct connecting said chambers and defining a channel for flow of molten glass from said furnace chamber to said feeder chamber,
    (1) said duct having a bottom wall and two longitudinal side walls;
  (b) a plurality of electrode means spaced longitudinally from each other in a peripheral zone of said duct adjacent said walls so as to leave said channel substantially unobstructed;
  (c) supply circuit means connected to said electrode means for passing electric current through said electrode means and longitudinally through said glass in said channel, said supply circuit including
    (1) current controlling means,
    (2) temperature sensing means arranged for thermal contact with the flowing glass outside said furnace chamber,
    (3) means operatively connecting said temperature sensing means and said current controlling means for operating said current controlling means in response to the sensed temperature,
    (4) current sensing means for sensing the current passing through said glass, and
    (5) means operatively connecting said current sensing means to said current controlling means for stabilizing said current.

References Cited

UNITED STATES PATENTS

| 2,512,761 | 6/1950 | Arbeit | 13—6 |
| 2,866,838 | 12/1958 | Paxton | 13—6 |
| 3,182,112 | 5/1965 | Torok | 13—6 |

BERNARD A. GILHEANY, *Primary Examiner.*

H. B. GILSON, *Assistant Examiner.*